UNITED STATES PATENT OFFICE.

KURT GOTTLOB, OF ELBERFELD, GERMANY, ASSIGNOR TO FARBENFABRIKEN VORM. FRIEDR. BAYER & CO., OF ELBERFELD, GERMANY, A CORPORATION OF GERMANY.

PROCESS OF PRODUCING HYDROCARBONS WITH MORE THAN ONE DOUBLE BOND.

1,065,522.  Specification of Letters Patent.  Patented June 24, 1913.

No Drawing.  Application filed August 12, 1911.  Serial No. 643,713.

*To all whom it may concern:*

Be it known that I, KURT GOTTLOB, doctor of philosophy, chemist, citizen of the Empire of Austria-Hungary, residing at Elberfeld, Germany, have invented new and useful Improvements in Processes of Producing Hydrocarbons with More Than One Double Bond, of which the following is a specification.

It is known that isoprene can be obtained by passing vapors of turpentine oil through red hot tubes. The yield of isoprene by this process is however very small.

The purpose of this invention is a continuous process suitable for use on a large scale for the production of any desired quantities of isoprene or other aliphatic hydrocarbons with more than one double bond such as erythrene.

The new process consists in decomposing in a continuous operation turpentine oil or similar substances such as terpenes by suitable forms of energy which may be obtained in different ways e. g. by immersing in turpentine or similar substances carbon or metallic or other filaments or rods heated by an electric current or in any other way, or by ultra-violet light, or by silent electric discharge, or by producing in the liquid sparks between electrodes, etc., in such manner that while the low boiling decomposition products such as isoprene are continuously removed, the higher boiling decomposition products and the not decomposed starting material remain and are further treated until converted into the low boiling compounds.

In the foregoing process the various constituents of turpentine, such as pinene, dipentene, etc., or the terpenes used, are continuously treated, and only the low boiling decomposition products removed. Decomposition of the terpenes and isomerization go on simultaneously, the isomerization products, among which dipentene is particularly valuable, remaining and being further reacted upon and decomposed.

When electrically heated rods or wires or other heated contact bodies are immersed in the liquid the vessel containing the liquid may be provided with a reflux condenser maintained at a temperature between that of the desired decomposition products and that of the starting material (turpentine, etc.). When electric sparks are produced in the liquid the gaseous products can be similarly removed and separated. An ordinary distillation vessel, provided with a reflux condenser, can be used in carrying out the present process, the decomposition being effected of the liquid or of its vapors. When a reflux cooler is used, warm water at a temperature above the boiling point of isoprene (about 37° C.) may be used in it, the temperature of such water permitting free escape of the isoprene vapors but condensing the turpentine and higher boiling fractions and returning them to the reaction liquid. With an ordinary distillation vessel provided with a reflux condenser with warm water, the immersion of an incandescent filament in the liquid causes immediate decomposition of the liquid with which it comes in contact, the isoprene escaping immediately and continually without remaining in contact with the incandescent body, while the uncharged starting material and higher boiling decomposition products are condensed and returned. The production and removal of the isoprene, etc., is thus local and continuous.

I claim:—

1. The process of producing aliphatic hydrocarbons with more than one double bond which comprises decomposing terpenes in such manner that the low boiling decomposition products are continuously removed while the undecomposed terpenes and higher boiling reaction products remain and are further treated, substantially as described.

2. The process of producing isoprene which comprises decomposing terpenes in such manner that the low boiling decomposition products are continuously removed while the undecomposed terpenes and higher boiling reaction products remain and are further treated, and isolating the resulting isoprene substantially as described.

3. The process of producing aliphatic hydrocarbons with more than one double bond which comprises decomposing turpentine oil in such manner that the low boiling decomposition products are continuously removed while the undecomposed turpentine oil and higher boiling reaction products remain and are further treated, and isolating the resulting hydrocarbons with more than one double bond, substantially as described.

4. The process of producing isoprene from turpentine oil which comprises decomposing turpentine oil in such manner that the low boiling decomposition products are continuously removed while the undecomposed turpentine oil and higher boiling reaction products remain and are further treated, and isolating the resulting isoprene, substantially as described.

In testimony whereof I have hereunto set my hand in the presence of two subscribing witnesses.

KURT GOTTLOB. [L. S.]

Witnesses:
ALBERT F. NUFER,
LOTT LOCKMANN.